Figure 1:
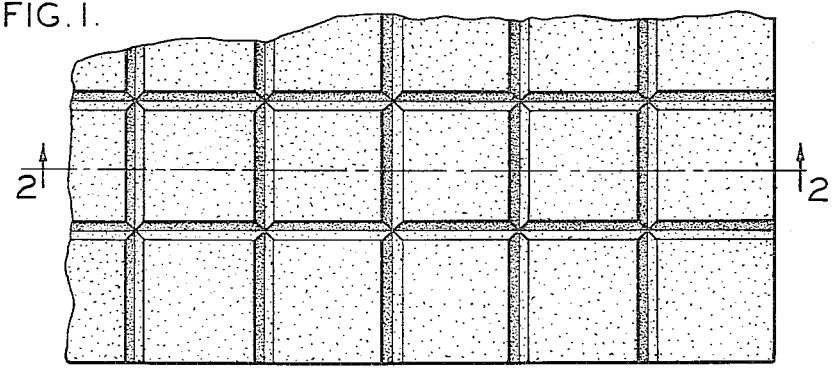

2,785,739

Patented Mar. 19, 1957

2,785,739

POLYURETHANE CUSHIONS

William A. McGregor, Jr., St. Louis, and James D. Mahoney, Ferguson, Mo., assignors to Mobay Chemical Company, St. Louis, Mo., a corporation of Delaware Application August 11, 1955, Serial No. 527,783

4 Claims. (Cl. 155—179)

This invention relates to polyurethane cushions.

In the present specification the term "seat cushion" is used in its broadest sense and includes all kinds of articles which are made for the purpose of imparting softness to stools, chairs, lounges, benches, etc. The term "functional surface" is intended to designate the surface which is faced upward and is to be in contact with the users of the cushion.

It is generally known to produce seat cushions from foam rubber. It is also generally known to those skilled in the art that by substituting polyurethane foam for latex foam in the manufacture of seat cushions, various advantages can be obtained. Thus, polyurethane foam is so tough that it can be sewn; it has outstanding resistance to oxidation and sunlight; and it can provide up to twice as much cushioning, pound for pound, as latex foam. However, polyurethane foams used in cushioning applications show a property which some manufacturers believe to be undesirable. When pressure is applied to a seat cushion made from polyurethane foam, an initial hardness is displayed. Although this initial hardness gives way rapidly as increasing pressure is applied, it is in conflict with current tastes which run toward very soft cushioning.

It is an object of the present invention to provide polyurethane cushions which do not exhibit an objectionable initial hardness. Another object is to provide polyurethane cushions which are in accordance with consumers' preference for softness. A further object is to provide polyurethane cushions which have an excellent feel. Still further objects will appear hereinafter.

From the following description it will be apparent how the foregoing objects and related ends are attained.

It has now been found that the indentation characteristics and/or initial softness of polyurethane foams can be made equivalent to latex foams by forming a plurality of grooves in the functional surface thereof, said grooves having a greater width at the top than at the bottom.

Although any grooves which are wider at the top than at the bottom will bring about the desired result, grooves which have a silhouette resembling a V are preferred.

The degree of initial softness obtained will naturally depend upon the number and the depth of the grooves formed in the functional surface of the seat cushion.

The grooves, by which the initial seating area of contact is reduced, can be formed in any suitable manner. Thus, the grooves can be cut into the functional surface of the polyurethane foam to be processed into seat cushions. Alternatively, the seat cushions of the invention can be made by foaming in place using molds of such shape as to produce the desired grooves in the functional surface of the product.

The surface pattern of the grooves is not of primary concern and will, in most cases, be decided by economical or esthetic considerations. Thus, the functional surface is preferably deformed in either a convenient or a pleasing pattern.

In a specific embodiment of the invention, a pattern of straight V-shaped grooves is cut into the functional surface of a polyurethane foam of suitable dimensions to obtain a cushion of most satisfactory indentation characteristics. The open upper part of said grooves is located in the functional surface of said polyurethane foam while the closed lower part of said grooves is situated below the above surface.

In a preferred embodiment of the invention, said straight V-shaped grooves form a pattern of adjoining squares. The grooves have a depth of about ⅛ to ½ of the thickness of the cushion and are located at a distance of ¾ to 3 inches from one another, said distance being measured between the centers of said grooves. Although the V-shaped grooves may have any desired width, they are preferably shaped in such manner as to form an angle of 5 to 75° C.

The details of the present invention will be apparent to those skilled in the art from a consideration of the following typical example of a specific embodiment thereof.

Example

A block of polyurethane foam is made by injecting into a mold a foamable mixture prepared by vigorously mixing: (1) 100 parts by volume of a polyester obtained from 16 mols of adipic acid, 16 mols of diethylene glycol and 1 mol of trimethylolpropane, (2) 25 parts by volume of toluylene diisocyanate and (3) an activator mixture consisting of 3 parts by volume of the adipic acid ester of N-diethylaminoethanol, 2 parts by volume of ammonium oleate and 1.2 parts by volume of water. The temperature of the freshly prepared foamable mixture is 37° C., while the temperature of the foaming mass in the mold rises as high as 100° C. due to the heat evolved in the reaction. The elastic foam recovered from the mold has a density of 70 kg./m.$^3$.

The block of polyurethane foam thus obtained is cut into seat cushions of the following dimensions: 18 inches wide, 18 inches broad and 2 inches thick. Now one set of V-shaped grooves is cut into the functional surface of each cushion, the grooves being parallel and ¾ inch deep. The angle formed by the grooves is 10° and the grooves are 1 inch apart measuring from center to center. Thereupon a second set of parallel, V-shaped grooves is cut into the functional surface of each cushion, these grooves being perpendicular to the first grooves and having the same dimensions and spacing as the latter.

Figure 2:
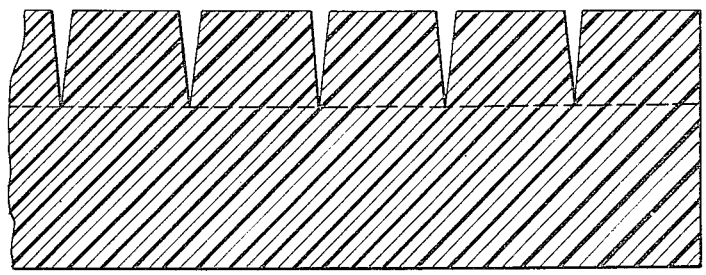
Figure 3:
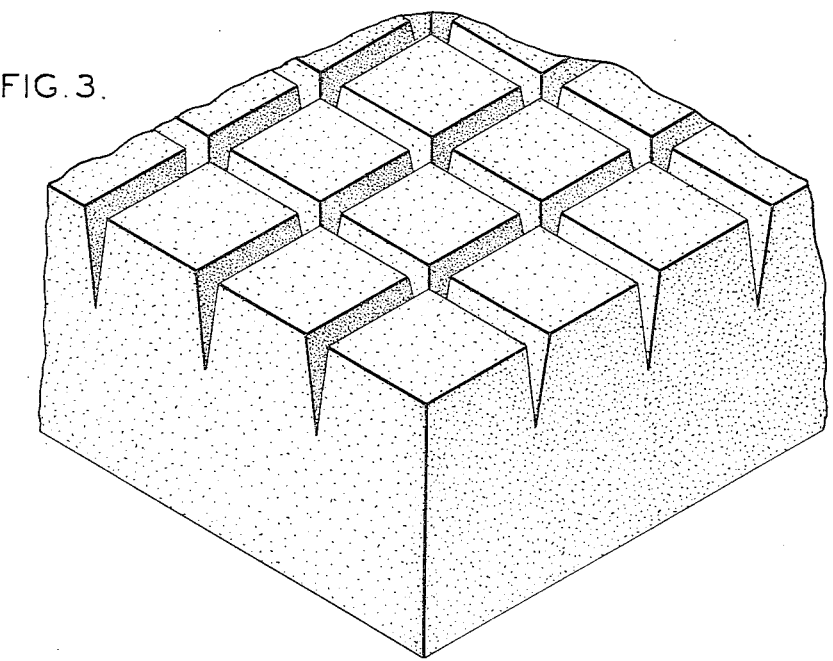

A cushion thus obtained is illustrated in the accompanying drawing, in which Figure 1 is a top view, Figure 2 is a longitudinal section and Figure 3 is a perspective view of the cushion.

The cushion may be covered, if desired, with a suitable upholstery fabric.

The polyurethane foam, from which the cushions of the invention are made, is produced in known manner from a polyester containing free hydroxyl and/or carboxylic groups, a polyisocyanate and, if desired, an activator mixture, the activator mixture containing the amount of water (0.5 to 10%, based on the polyester) usually necessary for the foaming process, an emulsifier (0.5 to 10%, based on the polyester) and an accelerator, such as a tertiary amine (0.1 to 5%, based on the polyester). Although the polyurethane foam may be prepared by simply mixing the above components, it has proven particularly advantageous to use the process and apparatus described and claimed in copending U. S. application Serial No. 327,522, filed December 23, 1952. In accordance with the process of this application, a polyester, a polyisocyanate and an activator mixture are brought together in an enclosed mixer, at least the activator mixture being injected at a pressure substantially higher than that in said mixer, and the resulting liquid mixture is then discharged from the mixer into a mold. In the mold, a solid polyurethane foam is formed due to a plurality of chemical reactions, which involve evolution of carbon dioxide, poly-addition of polyester and polyisocyanate molecules, and cross-linking between polyurethane chains.

In the above example, toluylene diisocyanate is used for convenience as the polyisocyanate reactant, but any organic polyisocyanate may be used in its place, including 1,4-phenylene diisocyanate, 1,5-naphtylene diisocyanate, triphenyl methane-4,4',4"-triisocyanate, diphenyl methane - 4,4' - diisocyanate and dimethyl diphenyl - 4,4' - diisocyanate.

The polyesters suitable for the production of the polyurethane foam are prepared in known manner from polyhydric alcohols and polycarboxylic acids using such proportions of the reactants as to produce polyesters having an hydroxyl number of 30 to 450 and an acid number of 0 to 10.

A large number of polyhydric alcohols may be used for preparing the polyesters, as for instance, ethylene glycol, diethylene glycol, polyethylene glycol, 1,2-propylene glycol, 1,3 - butylene glycol, 1,4 - butylene glycol, 1,6-hexanediol, trimethylol ethane, trimethylol propane, glycerine, hexanetriol and pentaerythritol.

Among the polycarboxylic acids which may be esterified with the polyhydric alcohols to form suitable polyesters are adipic acid, pthalic acid and succinic acid.

In the foaming process, generally 0.5 to 1.5 mols of diisocyanate are used for each gram equivalent of hydroxyl groups contained in the polyester.

The above description is intended to be illustrative only. Any modification or variation thereof which conforms to the spirit of the invention is intended to be included within the scope of the claims.

What is claimed is:

1. As a new article of manufacture, a foamed polyurethane seat cushion, the functional surface of which is deformed by a plurality of grooves, said grooves having a greater width at the top than at the bottom.

2. As a new article of manufacture, a formed polyurethane seat cushion, the functional surface of which is deformed by a plurality of V-shaped grooves, the open upper part of said V-shaped grooves being located at the functional surface of said seat cushions and the closed lower part of said V-shaped grooves being situated below said functional surface.

3. As a new article of manufacture, a foamed polyurethane seat cushion, the functional surface of which is deformed by a pattern of straight V-shaped grooves, the open upper part of said V-shaped grooves being located at the functional surface of said seat cushion and the closed lower part of said V-shaped grooves being situated below said functional surface.

4. As a new article of manufacture, a foamed polyurethane seat cushion, the functional surface of which is deformed by a pattern of straight V-shaped grooves forming adjoining squares, the open upper part of said V-shaped grooves being located at the functional surface of said seat cushions and the closed lower part of said V-shaped grooves being situated below said functional surface.

References Cited in the file of this patent

UNITED STATES PATENTS 2,082,151    DePoix _____ June 1, 1937